United States Patent [19]

Allan

[11] 4,180,840
[45] Dec. 25, 1979

[54] CLEANING DISK ASSEMBLY FOR OPPOSITELY-ORIENTED, DUAL-COMPONENT MAGNETIC TRANSDUCERS

[75] Inventor: James C. Allan, Kinnesswood, Scotland

[73] Assignee: Burroughs Corporation, Detroit, Mich.

[21] Appl. No.: 914,113

[22] Filed: Jun. 9, 1978

[30] Foreign Application Priority Data

Mar. 29, 1978 [GB] United Kingdom ............... 12162/78

[51] Int. Cl.$^2$ .......................... G11B 5/41; G11B 25/04
[52] U.S. Cl. ...................................... 360/128; 360/99; 360/137
[58] Field of Search ..................... 360/128, 137, 97–99, 360/86, 133, 135

[56] References Cited

U.S. PATENT DOCUMENTS

| | | | |
|---|---|---|---|
| 3,668,658 | 6/1972 | Flores et al. | 360/97 |
| 3,931,644 | 1/1976 | Ward | 360/86 |
| 4,003,088 | 1/1977 | Schwartz | 360/133 |
| 4,065,798 | 12/1977 | Sugisaki et al. | 360/128 |
| 4,085,428 | 4/1978 | Green et al. | 360/99 |
| 4,106,067 | 8/1978 | Masuyama et al. | 360/137 |

FOREIGN PATENT DOCUMENTS 2556919 12/1975 Fed. Rep. of Germany ........... 360/128

*Primary Examiner*—Alfred H. Eddleman
*Attorney, Agent, or Firm*—Gerald J. Woloson; Edward J. Feeney, Jr.; Kevin R. Peterson

[57] ABSTRACT

Various flexible disk information storage systems use a dual-component access arm which includes both a magnetic transducer and a pressure pad. The transducer rides on one side of the disk while the pressure pad is applied to the opposite side of the disk so as to increase the loading of the transducer against the normally-flexible surface. Such disk systems can include two such transducer/pad pairs, oppositely-oriented so that both sides of the disk can be read. In the disclosed cleaning disk assembly, an abrasive material is placed on one side of the disk and a smooth surface is placed on the other. The abrasive side is used to clean a transducer, while the smooth side is used to present a standard surface to the associated pressure pad. The cleaning assembly includes a reversible container having special apertures which enable the system software, in conjunction with disk drive detection elements, to automatically determine abrasive surface orientation. The assembly thus enables either one of the transducers to be cleaned without danger of loading the corresponding pressure pad onto the abrasive side of the cleaning disk.

2 Claims, 7 Drawing Figures

CLEANING DISK ASSEMBLY FOR OPPOSITELY-ORIENTED, DUAL-COMPONENT MAGNETIC TRANSDUCERS

BACKGROUND OF THE INVENTION

The invention relates generally to apparatus which are used to clean magnetic transducers and in particular to apparatus for cleaning dual-component transducer arms in flexible disk information storage systems.

OBJECTS OF THE INVENTION

It is an object of this invention to provide a cleaning disk which can be used to clean the oppositely-oriented magnetic transducers of dual-component access arms in flexible disk information storage systems.

It is another object of this invention to prevent the accidental engagement of the pressure pads in such arms against the cleaning surface.

It is a further object of this invention to provide a cleaning disk assembly which enables system software to automatically perform the cleaning operation without danger of loading a pressure pad against the abrasive surface.

SUMMARY OF THE INVENTION

These and other objects of the invention are achieved in the disclosed cleaning disk assembly which includes a cleaning disk having an abrasive material on one side and a non-abrasive material on the other. The cleaning disk is housed in a container having apertures which allow the disk surfaces to be accessed by dual-component transducer arms and which enable system software, in conjunction with disk drive detection elements, to automatically determine cleaning disk orientation so as to prevent the loading of pressure pads against the abrasive surface.

Other objects, features, and advantages will be readily apparent from the following detailed description when considered with the accompanying drawings which show by way of example and not limitation the principle of the invention and a preferred mode of applying that principle.

BRIEF DESCRIPTION OF THE DRAWINGS

FIG. 2A presents a plan view of the cleaning disk while

FIG. 3A displays one side of the assembly cartridge while

DESCRIPTION OF THE PREFERRED EMBODIMENT

Figure 1:
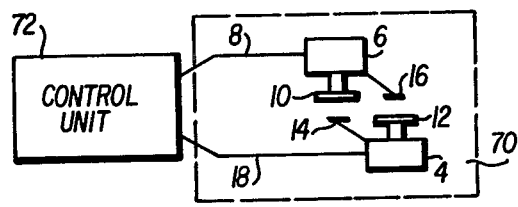
FIG. 1 shows in schematic form that dual-component access arm assembly for which the cleaning disk assembly is designed.

In general, cleaning disk 20, having an abrasive surface 28 and a smooth surface 30, is mounted within a cartridge 40 having an arm access aperture 52 and an orientation aperture 54. The disk and cartridge together form the cleaning disk assembly. After the assembly is mounted on disk drive unit 68, system software 74 generates commands for control unit 72 which causes access arm assembly 70 to be moved into proximity of the cleaning disk. According to the indication received by probe 78 detecting the presence or absence of orientation aperture 54, the proper one of the pair of heads 10 or 12 is loaded onto the abrasive surface 28, while the corresponding pressure pad 14 or 16 is loaded onto the smooth surface 30. The cleaning routine is then implemented without danger of having loaded the improper pressure pad 16 or 14 onto abrasive surface 28.

FIG. 1 shows in schematic form the access arm assembly 70 for which the cleaning disk is designed. One embodiment of such an arm assembly is described in detail in U.S. Pat. No. 4,085,428, the disclosure for which is hereby incorporated by reference. At the end of arms 8 and 18 are mounted transducers 10 and 12 for writing and reading information from opposite sides of a flexible disk magnetic recording medium. Opposite from each of the transducer heads are selectively-engageable pressure pads 14 and 16. The pads are moved into contact with the disk by means of actuators 4 and 6. The pressure pad rides on the opposite side of the disk from the corresponding transducer to thereby increase the loading of the transducer against the normally-flexible surface. The selective operation of actuators 4 and 6, as well as the movement of the arms 8 and 18 across the disk surface, is effected through control unit 72.

Figure 2A:
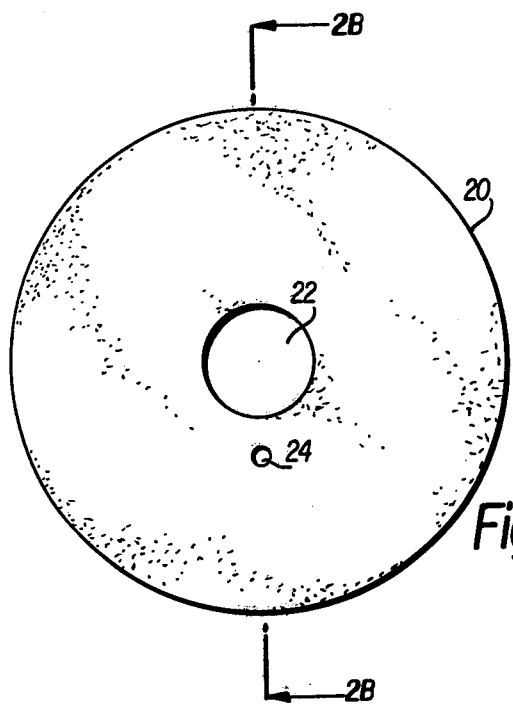
Figure 2B:
FIG. 2B shows a cross-sectional view.

In FIG. 2A, showing a plan view of the cleaning disk, cleaning disk 20 has a central spindle aperture 22 as well as an index aperture 24. The index aperture is used for generating timing signals as will be explained in conjunction with FIGS. 4 and 5. A cross-sectional view of the cleaning disk is shown in FIG. 2B. One surface of the disk 20 carries an abrasive material 28 while the opposite surface 30 has a non-abrasive finish.

The disk substrate itself can be any of a variety of well-known flexible disk media, for example polyethylene terephthalate (Mylar, a registered trademark of the DuPont Corporation) coated with a material equivalent to an iron oxide/polymer of 100 micro inches average thickness.

Abrasive material 28 can be any well-known non-shedding cleaning tissue, for example certain types of paper or the rayon polypropalene substance produced under the trade name "Novonette" by the Fiber Products Division of the Kendal Corporation. In one embodiment, the tissue was used with an average thickness of 0.008 inches. This material can be bonded to the substrate of disk 20 by various techniques well-known in the art. One such technique is heat-pressure lamination.

Material 28 is "abrasive" in that it can damage the soft surfaces of pressure pads 14 and 16. The material is also a cleaning medium because it can remove and retain contamination particles which collect on heads 10 and 12. These cleaning properties are an important reason why such material is commonly used as a liner inside of flexible disk cartridges where it cleans the disk surface by means of the same removal-and-retention process.

Figure 3A:
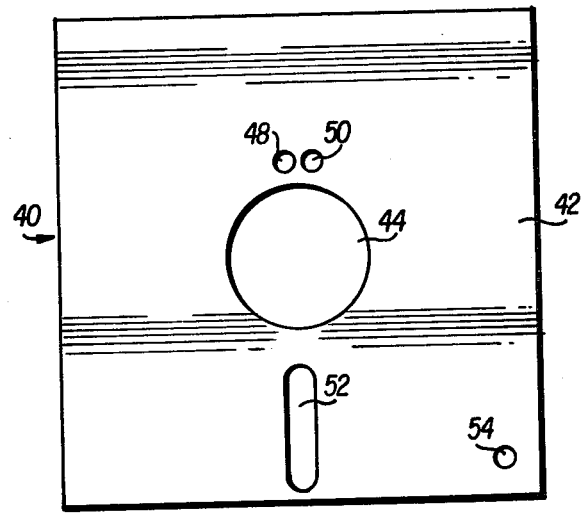
Figure 3B:
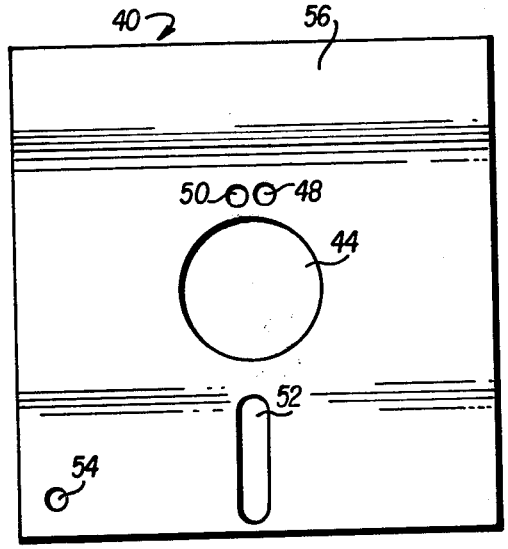
FIG. 3B shows the reverse side.

The cartridge 40, inside of which the cleaning disk 20 is mounted during the cleaning operation, appears in FIGS. 3A and 3B. FIG. 3A shows one side 42 of the cartridge with central spindle aperture 44 and index apertures 48 and 50. Aperture 52 is the opening through which the access arm assembly 70 makes contact with the abrasive disk, while the single aperture 54, in conjunction with an orientation probe described below, is used as an abrasion orientation means to indicate on which side of the disk cartridge the abrasive surface 28 of the enclosed disk can be found. In FIG. 3B the opposite surface 56 of cartridge 40 is shown with the various apertures of FIG. 3A in reverse position. In particular, orientation aperture 54 is now located on the opposite side of the cartridge. This opposite surface also contains an access aperture 52.

Figure 4:
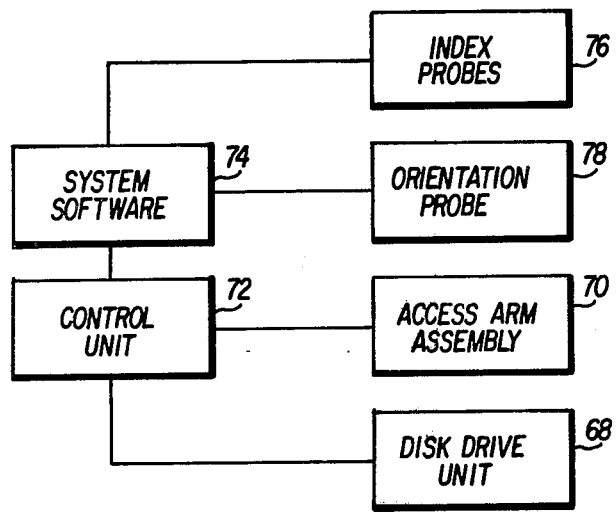
FIG. 4 is a block diagram of a sensing and control system in which the access arm assembly functions.

A block diagram of the transducer control system can be seen in FIG. 4. The individual elements are well-known in the art and have already been embodied in existing products.

Cartridge 40 containing the cleaning disk 20 is mounted on disk drive assembly 68. Orientation probe 78 detects the location of orientation aperture 54 and generates an appropriate signal for system software 74. System software 74 processes the orientation probe signal and transmits command information to control unit 72. Having the positive orientation information generated by orientation probe 78 in conjunction with orientation aperture 54, control unit 72 is now able to load the proper transducer head 10 or 12 onto the abrasive surface 28 and the corresponding pressure pad 14 or 16 onto the smooth surface 30 of the cleaning disk 20. Regardless of the orientation of the cartridge 40 within the disk drive unit, there is no danger of loading either one of the pressure pads 14 or 16 against the abrasive surface because of the combined action of probe 78 and aperture 54. Index probe 76 detects the passage of index mark 24 past index apertures 48 and 50 so as to generate timing signals for the cleaning routine of FIG. 5.

Figure 5:
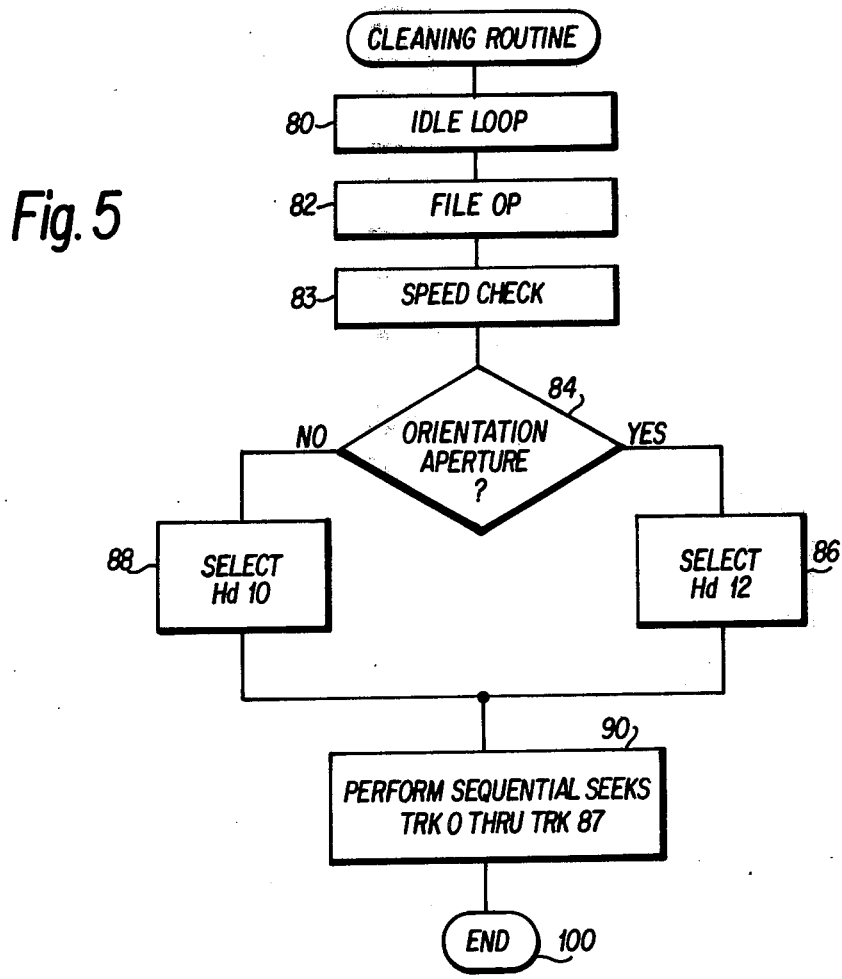
FIG. 5 shows a control routine used to perform the cleaning operation.

An example cleaning routine in FIG. 5 begins with an idle stage 80. A file operation command 82 is then generated to start the cleaning process. After the presence of a disk rotating at the correct speed is indicated at 83 by the periodic occurance of index mark 24 past apertures 48 and 50, a decision 84 is made as to whether the orientation probe 78 has encountered orientation aperture 54. A "no" outcome at stage 84 could be made to cause, at stage 88, head 10 and pressure pad 14 to be loaded against disk surfaces 28 and 30 respectively. A "yes" outcome at this stage could result in the opposite condition at stage 86 with head 12 and pressure pad 16 being loaded against cleaning disk surfaces 28 and 30 respectively. Once the loading is complete, system software 74 commands, at stage 90, the control unit 72 to sweep access arms 8 and 18 back and forth across the cleaning disk so as to perform the desired cleaning of the appropriate transducer head. The heads are swept across the entire disk surface so as to equalize wear of the abrasive side 28. The sweeping operation is performed in accordance with timing signals generated by system software 74. When the sweep sequence is complete, the cleaning routine ends at stage 100.

The preceeding description has presented in detail merely a preferred embodiment of the claimed invention. It will be understood, of course, that numerous other alternative embodiments encompassing many variations in the cleaning assembly, control system, and cleaning routine disclosed could be employed without the departing from the spirit and scope of the invention as set forth in the appended claims.

What is claimed is:

1. In a flexible disk information storage system having an access arm which includes two oppositely-oriented transducer and pressure pad pairs, where each pair includes both a magnetic transducer for writing and reading information on one side of the disk and a pressure pad applied to the other side of the disk for increasing the loading of the corresponding transducer against the normally-flexible surface, and where the engagement with the disk surface by each transducer and associated pressure pad is selectively controlled by signals generated within the storage system, apparatus for separately cleaning both of the magnetic transducers comprising:

A. cleaning disk means, for providing an abrasive first surface on which each transducer can be cleaned, and for providing a non-abrasive second surface as a standard operational substrate onto which the corresponding pressure pad can be applied without pad damage while each transducer is being cleaned;

B. disk cartridge means, for enclosing said cleaning disk means, for enabling said cleaning disk means to be reversibly mounted in the disk drive unit of the information storage system, and for enabling the drive unit to engage and rotate said cleaning disk means in either of its reversible orientations;

C. movement-free abrasion-orientation means, located in said disk cartridge means, for enabling said information storage system to automatically determine, for either orientation of said cartridge means, the side of said cartridge means on which said abrasive surface is located, so that, regardless of the cartridge means orientation, said system can command only the transducer which is adjacent said abrasive surface to engage said surface; and D. arm access means, located in said disk cartridge means, for enabling, upon appropriate command from said storage system, each transducer and the corresponding pressure pad to pass through said disk cartridge means and make contact with said abrasive first surface and with said non-abrasive second surface respectively, when said cartridge means is mounted in the information storage system;

whereby either transducer can be cleaned on said abrasive surface without danger of damaging either of the pressure pads by loading them onto said abrasive surface.

2. Apparatus according to claim 1 wherein:

A. said cleaning disk means includes index marker means, for providing timing indications to the information storage system; and B. said disk cartridge means includes index means for enabling said index marker means to provide said timing indications through said disk cartridge means.

* * * * *